US011912862B2

United States Patent
Houston et al.

(10) Patent No.: US 11,912,862 B2
(45) Date of Patent: Feb. 27, 2024

(54) REDUCED HAZE COMPOSITIONS FOR COATINGS

(71) Applicant: Eastman Chemical Company, Kingsport, TN (US)

(72) Inventors: Katelyn Rose Houston, Johnson City, TN (US); Jeremy Richard Lizotte, Gray, TN (US); Jessica Nicole Aldred, Kingsport, TN (US); John Thorton Maddox, Jonesborough, TN (US)

(73) Assignee: Eastman Chemical Company, Kingsport, TN (US)

( * ) Notice: Subject to any disclaimer, the term of this patent is extended or adjusted under 35 U.S.C. 154(b) by 86 days.

(21) Appl. No.: 17/309,663

(22) PCT Filed: Feb. 5, 2020

(86) PCT No.: PCT/US2020/016706
§ 371 (c)(1),
(2) Date: Jun. 14, 2021

(87) PCT Pub. No.: WO2020/163424
PCT Pub. Date: Aug. 13, 2020

(65) Prior Publication Data
US 2022/0081552 A1    Mar. 17, 2022

Related U.S. Application Data

(60) Provisional application No. 62/801,226, filed on Feb. 5, 2019.

(51) Int. Cl.
*C08L 67/02*    (2006.01)
*C08G 63/183*    (2006.01)
*C08G 63/199*    (2006.01)
*C08K 5/00*    (2006.01)
*C09D 167/02*    (2006.01)

(52) U.S. Cl.
CPC .......... *C08L 67/02* (2013.01); *C08G 63/183* (2013.01); *C08G 63/199* (2013.01); *C08K 5/0025* (2013.01); *C09D 167/02* (2013.01); *C08L 2201/10* (2013.01)

(58) Field of Classification Search
CPC .. C08G 63/181; C08G 63/183; C08G 63/199; C08K 5/0025; C08L 2201/10; C08L 67/02; C09D 167/02
See application file for complete search history.

(56) References Cited

U.S. PATENT DOCUMENTS

| | | | |
|---|---|---|---|
| 6,444,283 B1 | 9/2002 | Turner et al. | |
| 8,163,850 B2* | 4/2012 | Marsh | C08G 63/20 525/445 |
| 8,519,055 B2* | 8/2013 | Marsh | C09D 167/00 525/445 |
| 8,524,834 B2* | 9/2013 | Marsh | C09D 151/003 525/445 |
| 9,120,949 B2* | 9/2015 | Kim | C08G 63/60 |
| 2006/0217520 A1 | 9/2006 | Moens et al. | |
| 2010/0204363 A1* | 8/2010 | Marsh | C09D 151/08 523/400 |
| 2010/0204392 A1* | 8/2010 | Marsh | C08G 18/423 528/308 |
| 2010/0260954 A1 | 10/2010 | Stenson et al. | |
| 2012/0172520 A1 | 7/2012 | Marsh et al. | |
| 2013/0072628 A1* | 3/2013 | Crawford | C08L 67/02 525/418 |
| 2018/0223126 A1 | 8/2018 | Beccaria et al. | |
| 2019/0077908 A1* | 3/2019 | Sim | C09D 167/025 |
| 2022/0081552 A1 | 3/2022 | Houston et al. | |

FOREIGN PATENT DOCUMENTS

| | | | |
|---|---|---|---|
| EP | 0 444 690 B1 | | 2/1991 |
| JP | 2008163110 | * | 7/2008 |
| JP | 2008163110 A | | 7/2008 |
| KR | 20170093 | * | 8/2017 |
| WO | WO 2007-001561 A1 | | 1/2007 |

OTHER PUBLICATIONS

Wicks et al Polyester Resins, "Organic Coatings Science and Technology", 1999 pp. 246-257 (Year: 1999).*
Notification of Transmittal of the International Search Report and the Written Opinion of the International Searching Authority dated Apr. 29, 2020 for International Application No. PCT/US2020/016706.
ASTM Method D3281.
ASTM Method D5402.
ASTM Method E1899.
Wicks et al., Organic Coatings, Science and Technology, 2nd edition, p. 246-257, Wiley, New York, 1999.
European Search Report with a filing date of Nov. 22, 22, for European Application No. 20752249.1.

* cited by examiner

*Primary Examiner* — Frances Tischler
*Assistant Examiner* — Gennadiy Mesh
(74) *Attorney, Agent, or Firm* — Judith C. Rawls

(57) ABSTRACT

Polyester resin compositions that are desirable for use in solvent-borne metal packaging and coil coating applications, the composition comprising: (a) a polyester comprising residues of: (i) terephthalic acid and isophthalic acid; and (ii) a blend of at least two glycols; wherein the amount of terephthalic acid is 15 mole percent to 20 mole percent and the amount of isophthalic acid is 80 to 85 mole percent wherein the total amount of terephthalic acid and isophthalic acid in the resin equals 100 mole percent; and (b) a non-aqueous solvent; wherein the composition remains clear at a temperature of 20-30° C. for at least 120 days.

11 Claims, No Drawings

REDUCED HAZE COMPOSITIONS FOR COATINGS

FIELD OF THE INVENTION

This invention pertains to polyester compositions. More particularly, this invention pertains to polyesters composed of phthalic acids in combination with glycols that are desirable for use in polyester-solvent compositions in metal packaging and coil coating applications.

BACKGROUND OF THE INVENTION

Polyesters composed of phthalic acids are desirable for solvent-borne metal packaging and coil applications due to their high glass transition temperatures, hardness, chemical resistance, and hydrolytic stability. However, phthalic acid-based polyesters often have reduced shelf-life stability due to the occurrence of hazing when the phthalic acid-based polyesters are combined with solvents. Therefore, a need exists for polyester resins that have a reduced tendency to exhibit haze when combined with a solvent.

SUMMARY OF THE INVENTION

In an effort to provide stable polyester containing compositions, the inventors have surprisingly discovered that polyester resins having certain mole ratios of phthalic acids in combination with glycol blends in non-aqueous solvents exhibit limited solution haze and dramatically increased shelf-life stability. Polyesters with this unique monomer blend also produce coating compositions that exhibit improved metal coating performance as defined by high MEK (methyl ethyl ketone) double rubs, low wedge bend failure, and high food simulant retort resistance.

Thus, there is now provided a composition comprising:
(a) a polyester comprising residues of:
  (i) terephthalic acid and isophthalic acid; and
  (ii) a blend of at least two glycols;
wherein the amount of terephthalic acid is 15 mole percent to 20 mole percent and the amount of isophthalic acid is 80 to 85 mole percent wherein the total amount of terephthalic acid and isophthalic acid in the resin equals 100 mole percent; and
(b) a non-aqueous solvent;
wherein the composition remains clear at a temperature of about 20-30° C. for at least 120 days.

In another embodiment, the invention is a composition comprising:
(a) polyester comprising residues of:
  (i) terephthalic acid and isophthalic acid; and
  (ii) a blend of at least two glycols;
wherein the amount of terephthalic acid is about 15 mole percent to 20 mole percent and the amount of isophthalic acid is about 80 to 85 mole percent based on the total amount of terephthalic acid and isophthalic acid in the resin; and
(b) a non-aqueous solvent;
wherein the composition has a shelf life at a temperature of about 20-30° C. for at least 120 days without becoming hazy upon visual observation.

There is now also provided a polyester for use in metal food packaging applications comprising residues of:
(a) 80 to 85 mole percent isophthalic acid and 20 to 15 mole percent terephthalic acid based on the total amount of isophthalic acid and terephthalic acid in the resin; and
(b) a blend of at least two glycols.

There is now also provided a solvent borne coating composition for use in metal food packaging applications comprising:
A. a polyester resin comprising the residues of:
  (a) 80 to 85 mole percent isophthalic acid and 20 to 15 mole percent terephthalic acid based on the total amount of isophthalic acid and terephthalic acid in the resin; and
  (b) a blend of at least two glycols;
B. a non-aqueous solvent;
C. a crosslinker; and
D. optionally a catalyst.

There is now also provided a composition comprising:
A. a polyester comprising residues of:
  (a) terephthalic acid and isophthalic acid; and
  (b) a blend of at least two glycols;
wherein the ratio of terephthalic acid to isophthalic acid is about 20 mole percent terephthalic acid to 80 mole percent isophthalic acid, to about 15 mole percent terephthalic acid to 85 mole percent isophthalic acid based on the total amount of terephthalic acid and isophthalic acid in the resin; wherein said glycol blend is selected from 2,2,4,4-tetramethyl-1,3-cyclobutanediol, 1,4-cyclohexane dimethanol, 1,3-cyclohexane dimethanol, neopentyl glycol, ethylene glycol, 2-methyl 1,3-propane diol, 1,6-hexanediol, trimethylol propane; and
B. a solvent selected from the group consisting of benzene, xylene, mineral spirits, naphtha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, ethanol, n-propanol, isopropanol, n-butanol, sec-butanol, isobutanol, benzyl alcohol, cyclohexanone, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, 2,2,4-trimethyl-1,3-pentanediol monoisobutyrate, C9-10 dialkyl and trialkylbenzenes, C10 aromatics, C10-13 aromatics or combinations thereof;
wherein the polyester remains clear and does not becoming hazy upon visual observation after storage at a temperature of 20-30° C. for at least 120 days.

DETAILED DESCRIPTION

Unless otherwise indicated, all numbers expressing quantities of ingredients, properties such as molecular weight, reaction conditions, and so forth used in the specification and claims are to be understood as being modified in all instances by the term "about." Unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

As used in the specification and the appended claims, the singular forms "a," "an" and "the" include their plural referents unless the context clearly dictates otherwise. For example, a reference to a "polyester," a "dicarboxylic acid", a "residue" is synonymous with "at least one" or "one or more" polyesters, dicarboxylic acids, or residues and is thus intended to refer to both a single or plurality of polyesters, dicarboxylic acids, or residues. In addition, references to a composition containing or including "an" ingredient or "a" polyester is intended to include other ingredients or other polyesters, respectively, in addition to the one named. The terms "containing" or "including" are intended to be synonymous with the term "comprising", meaning that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified. Moreover, the lettering of process steps or ingredients is a convenient means for identifying discrete activities or ingredients and the recited lettering can be arranged in any sequence, unless otherwise indicated.

The term "aromatic" is intended to have its common meaning as would be understood by persons having ordinary skill in the art, that is benzenoid or other aromatic systems.

The term "curable, aromatic polyester", as used herein, is synonymous with the term "resin" and is intended to mean a thermosetting surface coating polymer prepared by the polycondensation of one or more specific acid components, diol components, and polyol components. The curable, aromatic polyester of the present invention is a thermoset polymer and is suitable as a resin for solvent-based coating. This polyester has an absolute molecular weight, typically from about 2000 g/mol to about 18000 g/mol, and would not be suitable for latex paint coatings or shaped objects by casting, blow molding, and other thermoforming processes commonly used for thermoplastic polymers. The polyester has a reactive functional group, typically a hydroxyl group or carboxyl group for the purpose of later reacting with an isocyanate crosslinker in a metal coating formulation. The functional group is controlled by having either excess diol or acid (from dicarboxylic acid or tricarboxylic acid) in the polyester resin composition. The desired crosslinking pathway will determine whether the polyester resin will be hydroxyl-terminated or carboxylic acid-terminated. This concept is known to those skilled in the art and described, for example, in *Organic Coatings Science and Technology*, 2nd ed., p. 246-257, by Z. Wicks, F. Jones, and S. Pappas, Wiley, New York, 1999.

The term "residue", as used herein in reference to the polymers of the invention, means any organic structure incorporated into a polymer through a polycondensation or ring opening reaction involving the corresponding monomer. It will also be understood by persons having ordinary skill in the art, that the residues associated within the various curable polyesters of the invention can be derived from the parent monomer compound itself or any derivative of the parent compound. For example, the dicarboxylic acid residues referred to in the polymers of the invention may be derived from a dicarboxylic acid monomer or its associated acid halides, esters, salts, anhydrides, or mixtures thereof. Thus, as used herein, the term "dicarboxylic acid" is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a curable, aliphatic polyester.

As used herein, the term "hazy" or "haze" means a lack of transparency in a liquid due to material that is in the liquid blocking the transmission of light through the liquid. Similar terms are "opaque", "milky", "clouded", "partially transparent", "non-transparent" and "turbid".

As used herein the term "room temperature" means 20-30° C.

In the field of metal packaging coating, partly aromatic polyesters are utilized in metal coatings for their robust hardness and thermal properties, which enhance chemical and retort resistance. Resins used for metal coatings often incorporate terephthalic acid (TPA) or a combination of TPA with isophthalic acid (IPA) as the aromatic acid portion of the polyester. These materials as materials are sometimes referred to as "Purified Terephthalic Acid" and "Purified Isophthalic Acid". TPA is considered more desirable for enhanced mechanical properties. The analysis of a variety of competitive materials displayed the presence of TPA/IPA blends with no more than 68% IPA, as IPA is not typically a desirable monomer, resulting in reduced flexibility and poor wedge bend performance in metal packaging applications. To increase resin solubility and flexibility, aliphatic monomers, such as ethylene glycol (EG), neopentyl glycol (NPG), 1,6-hexanediol (HDO), and 2,2,4-trimethyl-1,3-pentanediol (TMPD), are often selected in combination with phthalic acids. Cycloaliphatic monomers, such as 1,4-cyclohexane dimethanol (CHDM), 2,2,4,4-tetramethyl-1,3-cyclobutanediol (TMCD), and tricyclodecanedimethanol (TCCDM), have been utilized for metal packaging resins to improve thermal properties (increase $T_g$), hardness, and toughness of the polyester (see for example U.S. 2010/0260954 A1). In particular, TMCD has been utilized to obtain high glass transition temperatures at lower molecular weights in order to increase solubility, allowing for a reduced level of VOCs and lower solution viscosity.

A major drawback of partly aromatic polyester resins is reduced shelf-life stability due to haze formation in solution. While not wishing to be bound by theory, haze formation has been associated with the formation of crystallites, which nucleate over time and crash out of solution, forming small particles that are detrimental to formulated coatings performance. These crystallites reduce the transparency of the solution causing a hazy visual appearance. These crystallites are attributed to an enrichment of crystalline polymer segments, such as IPA/NPG or TPA/CHDM. Some monomer blends are designed in an effort to construct non-uniformity in the polymer chain and reduce the ability to crystallize; however, even with combinations of cyclic, linear, and pendent-group containing glycols, hazing can occur.

Provided herein are copolyester compositions containing a unique blend of IPA and TPA that mitigates solution haze and substantially reduces typical aging phenomena and surface defects, such as cissing. Although this acid blend would be expected to result in a decrease in flexibility, surprisingly the coating performance is satisfactory. Furthermore, the performance of aged formulations that utilize this unique diacid blend remains adequate much longer than comparable polyester resins of acid combinations outside of this range.

In one embodiment, our invention comprises a polyester comprising:
(a) an acid component comprising terephthalic acid (TPA) and isophthalic acid (IPA); and
(b) an alcohol component comprising a blend of at least two glycols;
wherein the amount of terephthalic acid is 15 mole percent to 20 mole percent and the amount of isophthalic acid is 80 mole percent to 85 mole percent; wherein the total IPA and TPA content of the resin equals 100 mole percent; and wherein the polyester has a shelf life at room temperature of at least 120 days without becoming hazy upon visual observation.

The acid component may optionally further comprise acids other than IPA and TPA such as naphthalene dicarboxylic acid and 1,4-cyclohexanedicarboxylic acid.

The alcohol component comprises a combination of at least two glycols such as 2,2,4,4-tetramethyl-1,3-cyclobutanediol (TMCD),1,4-cyclohexane dimethanol, 1,3-cyclohexane dimethanol, neopentyl glycol, ethylene glycol, 2-methyl 1,3-propane diol, 1,6-hexanediol, and trimethylol propane.

In another embodiment, the invention is a composition comprising:
(a) a polyester comprising residues of:
(i) terephthalic acid and isophthalic acid; and
(ii) a blend of at least two glycols;
wherein the ratio of terephthalic acid to isophthalic acid is about 20 mole percent terephthalic acid to 80 mole percent isophthalic acid, to about 15 mole percent terephthalic acid to 85 mole percent isophthalic acid based on the total amount of terephthalic acid and isophthalic acid in the resin; and
(b) a non-aqueous solvent;
wherein the composition remains clear at a temperature of 20-30° C. for at least 120 days.

Examples of suitable solvents include, but are not limited to benzene, xylene, mineral spirits, naphtha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, ethanol, n-propanol, isopropanol, n-butanol, sec-butanol, isobutanol, benzyl alcohol, cyclohexanone, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol monoisobutyrate, ethylene glycol mono-octyl ether, diacetone alcohol, 2,2,4-trimethyl-1,3-pentanediol monoisobutyrate (available commercially from Eastman Chemical Co. under the trademark TEXANOL™), AROMATIC 100 ($C_{9-10}$ dialkyl and trialkylbenzenes), AROMATIC 150 ($C_{10}$ aromatics, >1% naphthalene) or AROMATIC 200 ($C_{10-13}$ aromatics, >1% naphthalene) available commercially from ExxonMobil Corporation or combinations thereof.

Also provided is a solvent borne coating composition for use in metal food packaging applications comprising:
A. a polyester resin comprising the residues of:
(a) 80 to 85 mole percent isophthalic acid and 20 to 15 mole percent terephthalic acid based on the total amount of isophthalic acid and terephthalic acid in the resin; and
(b) a blend of at least two glycols;
B. a non-aqueous solvent;
C. a crosslinker; and
D. optionally a catalyst.

Isocyanates can be used as crosslinkers in accordance with the invention. Representative isocyanates include, but are not limited to, at least one compound chosen from toluene diisocyanate, diphenylmethane 4,4'-diisocyanate, methylenebis-4,4'-isocyanatocyclohexane, isophorone diisocyanate, 1,6-hexamethylene diisocyanate, 1,4-cyclohexane diisocyanate, p-phenylene diisocyanate, and triphenylmethane 4,4',4"-triisocyanate, tetramethyl xylene diisocyanate, metaxylene diisocyanate, polyisocyanates, 1,4-butylene diisocyanate, methylene bis (4-cyclohexyl isocyanate), isophorone diisocyanate and isocyanate-terminated adducts of ethylene glycol, 1,4-butylene glycol, and trimethylol propane.

Phenolic and amino materials can also be used as crosslinkers. Suitable phenolics include phenolic resins derived from ortho, meta, para cresols along with phenol and can include other functionally substituted phenols. Examples of suitable phenolic materials that can be employed include phenol, cresol, p-phenylphenol, p-tert-butylphenol, p-tert-amylphenol, cyclopentylphenol, cresylic acid, and combinations thereof. Suitable amino materials include melamine and benzoguamine and related resins.

The coating composition can also comprise isocyanate-terminated adducts of diols and polyols and amides, such as ethylene glycol, 1,4-butylene glycol, trimethylol propane, caprolactam, etc., as crosslinkers. These crosslinkers are formed by reacting more than one mole of a diisocyanate, such as those mentioned, with one mole of a diol or polyol to form a higher molecular weight isocyanate prepolymer with a functionality of 2 to 3. Preferred crosslinkers include caprolactam blocked aliphatic polyisocyanates based on IPDI (isophorone diisocyanate). Some commercial examples of isocyanate-terminated adducts include isocyanate crosslinkers sold under the DESMODUR™ (such as Desmodur BL 2078/2) and MONDUR™ product lines by Covestro AG.

Examples of aliphatic isocyanates include 1,6-hexamethylene diisocyanate, 1,4-butylene diisocyanate, methylene bis(4-cyclohexyl isocyanate), isophorone diisocyanate, and combinations thereof. Mixtures of isocyanate crosslinkers can also be employed.

Catalysts can optionally be used to accelerate the rate of the polycondensation reaction. The catalyst may be any food grade catalyst known in the art for the formation of a polyester resins. For example, FASCAT® 9100 (monobutyltin oxide) and FASCAT® 9102 (monobutyltin tris (2-ethylhexanoate)) available from PMC Organometallix™ may be used in this invention. The amount of catalyst may be determined by routine experimentation as understood by those skilled in the art. Preferably, a catalyst is added in amounts ranging from about 0.01 to about 1.00 weight percent, based on the amount of reactants.

Stoichiometric calculations for the curable polyester and isocyanate reaction are known to those skilled in the art and are described in The Chemistry of Polyurethane Coatings, Technical Publication p. 20, by Bayer Material Science, 2005. Persons having ordinary skill in the art will understand that crosslinking between the polyester resin and isocyanate reaches maximum molecular weight and optimal properties associated with molecular weight at an isocyanate:hydroxyl ratio of about 1:1; that is, when one equivalent of isocyanate (—NCO) reacts with one equivalent of hydroxyl (—OH). Typically, however, a small excess of isocyanate, about 5-10%, is used to allow for the loss of isocyanate by the reaction with adventitious moisture from the atmosphere, solvents, and pigments. Other NCO:OH ratios can be used; for example, it may be desirable to vary the NCO to OH ratio to less than 1:1 to improve flexibility or greater than 1:1 to produce harder, more chemical resistant coatings.

In some embodiments, the solvent borne thermosetting coating composition has an NCO:OH ratio of from about 0.9:1.0 to about 2.5:1.0. Examples of other NCO:OH ratios are about 0.95:1.0 to about 1.25:1.0 and about 0.95:1.0 to about 1.1:1.0.

In some embodiments the solvent borne coating composition for use in metal food packaging applications also comprises about 30 to about 70 weight percent of at least one solvent, based on the total weight of the curable polyester, isocyanate, and the solvent. Examples of solvents include, but are not limited to benzene, xylene, mineral spirits, naphtha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, ethanol, n-propanol, isopropanol, n-butanol, sec-butanol, isobutanol, benzyl alcohol, cyclohexanone, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, 2,2,4-trimethyl-1,3-pentanediol monoisobutyrate, AROMATIC 100, AROMATIC 150 or AROMATIC 200 or combinations thereof. Typically, the coating composition of this invention will comprise about 30 to about 90 weight percent solids (i.e., non-volatiles), based on the total weight of the coating composition. Some additional examples of weight percent solids for the coating composition of the invention are 50, 60, 65, 70, 75, 80, and 85 weight percent.

In some embodiments, the curable aromatic polyester can comprise hydroxyl-terminated end groups and the crosslinker can comprise at least one isocyanate and a crosslinking catalyst.

Examples of isocyanate crosslinking catalysts include FASCAT™ 4102 (monobutyltin tris (2-ethylhexanoate)), FASCAT™ 4100 (monobutyltin oxide) both available from PMC Organometallix™, DABCO® T-12 (dibutyltin dilaurate) available from Air Products and K-KAT™ 348 (bismuth carboxylate catalyst), K-KAT™ 4205 (zirconium chelate complex), K-KAT™ 5218 (aluminum chelate complex), K-KAT™ XC-6212™ (zirconium chelate complex) non-tin catalysts available from King Industries and tertiary amines such as trialkylamines, for example triethylene amine, triethylene diamine and the like.

Examples

Disclosed are copolyester compositions containing linear and cycloaliphatic glycol monomers, including CHDM, which is known in the art for its good chemical, hydrolytic, stain, and corrosion resistance. In several coatings applications, <30 mol % CHDM is often utilized in an effort to minimize crystallinity while obtaining some of the benefits of the CHDM monomer. In polyester chemistry, the combination of CHDM with TPA is known to produce highly crystalline polyesters with low solubility.

The inventors have explored polyols for metal packaging coatings containing up to 40 mol % CHDM and up to 70 mol % IPA. When these freshly prepared polyols are formulated into coating formulations, the subsequent coatings displayed excellent performance as measured by wedge bend, double rubs, and retort simulation. However, problems occurred when the resins were stored at room temperature prior to incorporation into a coating composition. The resin solutions typically become hazy after less than 15 days storage at room temperature. Additionally, after additional storage time has passed, hazy polyester resins added to coating compositions may cause a cissing phenomenon (e.g., film defects) upon drawdown on metal substrates.

The inventors investigated acid molar ratios of IPA/TPA of 70/30, 40/60, 20/80 and 0/100 while utilizing a blend of cyclic, linear, and pendent-group containing glycols. Upon discovery of poor shelf-life stability, a comprehensive study of IPA/TPA blends was performed. Resins containing 80-85 mol % IPA and 15-20 mol % TPA were clear. These resins remained clear over time and, surprisingly, displayed excellent coating performance at such high IPA loadings.

The increase in shelf-life stability was also surprising, as changing the ratio of IPA/TPA does not change the solubility parameter significantly, but the apparent solubility of the resins was largely affected. The polyols in Table 1 also displayed very similar polymer properties in the bulk (before addition of solvent), such as AN, OHN, molecular weight, and $T_g$, and none of the polyols displayed a $T_m$. The similar thermal properties of the polyols both in the bulk and in solution suggest similar chain mobility. Thus, the decreased haze formation observed in the resins containing 80-85 mol % IPA and 15-20 mol % TPA (MPB and MPC, Table 1) could not be predicted as a function of suspected crystallization kinetics.

Experiments evaluating this unique acid ratio in combination with a single glycol demonstrated that the system also requires a blend of glycols, including but not limited to, cyclic and linear glycols in order to achieve clear solutions. Blended glycols are expected to increase structural irregularity; however, the blended glycol systems hazed in acid ratios outside of the unique combination of 80-85 mol % IPA and 15-20 mol % TPA.

Polyester Polyol Synthesis

The polyols shown in Table 1 were produced using a resin kettle reactor setup controlled with automated control software. The compositions were produced on a 3.5 mole scale using a 2 L kettle with overhead stirring and a partial condenser topped with total condenser and Dean Stark trap. Approximately 7.5-10 wt % (based on reaction yield) azeotroping solvent of high boiling point (Aromatic 100 or Aromatic 150) was used to both encourage egress of the water condensate out of the reaction mixture and to control viscosity using a paddle stirrer. Isophthalic acid (IPA), terephthalic acid (TPA), 1,4-cyclohexane dimethanol (CHDM), 2,2,4,4-tetramethylcyclobutanediol (TMCD), 1,6-hexanediol (HDO), and AROMATIC 150 were added to the reactor which was then completely assembled. Butyl tin trisethylhexanoate (FASCAT™ 4102 or 4100 available commercially from PMC Organometallix, Inc.) was added via the sampling port after the reactor had been assembled and blanketed with nitrogen for the reaction. Additional SHELLSOL™ A150 (a mixture of C9-11 hydrocarbons with >99% aromatic content) and SHELLSOL™ A150 ND (C9-C10 aromatic hydrocarbon solvent with a naphthalene content below 1% m/m), available commercially from Shell Chemicals, was added to a Dean Stark trap to maintain an approximate 10 weight percent solvent level in the reaction kettle. The reaction mixture was heated without stirring from room temperature to 150° C. using a set output controlled through the automation system. Once the reaction mixture was fluid enough, stirring was started to encourage even heating of the mixture. At 150° C., the control of heating was switched to automated control and the temperature was ramped to 230° C. over the course of 4 hours. The reaction was held at 230° C. for 1 hour and then heated to 240° C. over the course of 1 hour. The reaction was then held at 240° C. and sampled every 0.5-1 hours upon clearing until the desired acid value was reached. The reaction mixture was then further diluted with SHELLSOL™ A100 (available commercially from Shell Chemicals) to target a weight percent solid of 60%. The solution was filtered through a ~250 μm paint filter prior to use in the formulation and application testing. It should be noted that the glycol excesses were determined empirically for the lab reactor and may be different depending on the partial condenser and reactor design used. The glycol:acid ratio was also manipulated to enable achieving the same molecular weight with simply different acid and hydroxyl end levels.

The resins produced in Table 3 utilized a method that does not require solvent. These polyols were synthesized on a 0.5 mole. Isophthalic acid (IPA) and terephthalic acid (TPA) as well as 1,4-cyclohexane dimethanol (CHDM), 2,2,4,4-tetramethylcyclobutanediol (TMCD), 1,6-hexanediol (HDO), and/or 2-methyl-1,3-propanediol (MP Diol) were added to the reactor setup. The setup uses a 500 mL round bottom flask equipped with an overhead stirrer, an arm leading to a condensate collection flask, a metal bath for efficient heat transfer, and air flow that allows for vacuum and a continuous nitrogen blanket. These reactions were typically started around 180° C. and ramped up to 240° C. over 3 hours and then held at 240° C. until the reaction finished, with sampling and corrections made as outlined above. Occasionally light vacuum of 100 torr was pulled to remove any remaining condensate and drive the reaction further toward completion. The finished polymer was dissolved to a targeted 60% solids in the same ratio of A100:A150-ND from the resin kettle setup. The polyols produced in Table 2 utilized a combination of the two synthetic methods.

Polyester Resin Molecular Properties Characterization

Absolute molecular weights were determined by GPC chromatography equipped with a light scattering detector. Molecular weights were determined by gel permeation chromatography (GPC) utilizing polystyrene equivalents and 95:5 $MeCl_2$:HFIP (methylene chloride: hexafluoro-2-propanol) carrier solvent. The glass transition temperature ($T_g$) was determined using differential scanning calorimetry (DSC) at a 20° C./min ramp rate with a nitrogen sweep. The glass transition temperatures are based on second heat thermograms. The inherent viscosities were determined in a 60/40 weight ratio solvent blend of phenol/1,1,2,2-tetrachloroethane using an Ubbelohde viscometer. Acid numbers were determined using colorimetric titration in pyridine with phenolphthalein indicator and a 0.1 N KOH titrant administered with an auto-dispensing titrator. The hydroxyl numbers can be determined using a titration method based on ASTM Method E1899 or by NMR.

The polyol examples produced via the above procedures are shown in Tables 1-3.

Shelf Life Stability

The polyester polyols evaluated for shelf life stability are shown in Tables 1-3. The compositions are reported as mole percentages based on the total acids and total diols in the resin compositions. For example in Table 1, resin MPB is composed of 15 mole percent terephthalic acid (TPA) and 85 mole percent isophthalic acid (IPA) based on the total molar amount of acid in the resins, 40 mole percent 2,2,4,4,tetramethyl-1,3-cyclobutanediol (TMCD), 40 mole percent cyclohexanediol (CHDM) and 20 mole percent 1,6-hexanedilol based on the total molar amount of diol in the resin composition. Shelf life stability could be tested by adding a 4 oz sample of the polyol solution to a clear glass jar, capping it, and leaving it on the shelf under both ambient conditions, (20-30° C. room temperature) and 10° C. (refrigerator) and checking daily for the first week and then weekly for signs of haze crystal formation or separation. Accelerated shelf life stability tests were performed at 10° C. because haze forms more rapidly at reduced temperatures. Haze is visible to the naked eye and first appears as 'wisps' or 'clouds' forming in the otherwise clear polyol. The shelf life test ends when the first signs of haze or separation appear. Over time, the polyol will change from being completely clear to completely opaque.

Wedge Bend

A coupon measuring 1.5" wide×4" long was cut from the coated panel. This coupon was tested by a Gardco coverall bend and impact tester following ASTM method D 3281. Once the coupon was bent into a wedge shape it was soaked in a copper sulfate solution for 5 minutes to make any coating cracking visible. Excess copper sulfate solution was removed by blotting with a dry towel. The failure of the coating was measured by using a ruler and a lighted magnifying glass.

MEK Double Rubs

The resistance to the solvent was measured using a double rub test method as outlined in ASTM D 5402.

TABLE 1

| | Metal packaging resins A-E | | | | |
|---|---|---|---|---|---|
| | MPA | MPB | MPC | MPD | MPE |
| TPA | 0.00 | 0.15 | 0.20 | 0.25 | 0.30 |
| IPA | 1.00 | 0.85 | 0.80 | 0.75 | 0.70 |
| TMCD | 0.40 | 0.40 | 0.40 | 0.40 | 0.40 |
| CHDM | 0.40 | 0.40 | 0.40 | 0.40 | 0.40 |
| HDO | 0.20 | 0.20 | 0.20 | 0.20 | 0.20 |
| | Polymer properties | | | | |
| AN | 2.2 | 3.0 | 2.4 | 2.2 | 2.2 |
| OHN | 15.4 | 15.4 | 16.2 | 16.1 | 16.8 |
| $M_n$ (g/mol) | 10023 | 12477 | 12587 | 12490 | 13139 |
| $M_w$ (g/mol) | 23606 | 25787 | 25624 | 25142 | 26272 |
| $T_g$ neat resin (° C.) | 66 | 73 | 72 | 75 | 76 |
| $T_g$ resin in A100 (° C.) | N/A | −66 | −68 | −65 | −61 |
| | Performance | | | | |
| MEK DR's | N/A | 82 | 107 | N/A | 85 |
| Wedge bend (mm) | N/A | 36 | 49 | N/A | 35 |

TABLE 1-continued

| | Metal packaging resins A-E | | | | |
|---|---|---|---|---|---|
| | MPA | MPB | MPC | MPD | MPE |
| | Days to haze | | | | |
| Room temperature | <17 | >120 | >120 | 0 | 14 |
| 10° C. | 0 | 117 | >120 | 0 | 5 |

Table 1 displays metal packaging polyesters containing similar polymer properties (e.g., molecular weight, AN, OHN, $T_g$) and a blend of cyclic and linear glycols. Table 1 shows that even with this blend of glycols, haze free solutions lasting >120 days at room temperature and >115 days at 10° C. can only be prepared by utilizing the unique ratio of 15-20 mol % TPA with 80-85 mol % IPA. Polymers that displayed immediate haze at 10° C. were not tested for performance.

TABLE 2

| | Metal packaging resins F-J | | | | |
|---|---|---|---|---|---|
| | MPF | MPG | MPH | MPI | MPJ |
| TPA | 0.60 | 0.60 | 0.80 | 1.00 | 1.00 |
| IPA | 0.40 | 0.40 | 0.20 | 0.00 | 0.00 |
| TMCD | 0.60 | 0.40 | 0.60 | 0.40 | 0.40 |
| CHDM | 0.10 | 0.40 | 0.10 | 0.30 | 0.40 |
| HDO | 0.30 | 0.20 | 0.30 | 0.00 | 0.20 |
| MP Diol | 0.00 | 0.00 | 0.00 | 0.30 | 0.00 |
| | Polymer properties | | | | |
| AN | 3.1 | 8.3 | 3.4 | 2.7 | 6.5 |
| OHN | 13.9 | 13.7 | 13.4 | 20.5 | 17.3 |
| $M_n$ (g/mol) | 13110 | 9016 | 14883 | 10984 | 9010 |
| $M_w$ (g/mol) | 26326 | 19993 | 29862 | 22047 | 19648 |
| $T_g$ neat resin (° C.) | 81 | 80 | 90 | 92 | 83 |
| | Days to haze | | | | |
| Room temperature | 0 | 0 | 0 | 0 | 0 |
| 10° C. | 0 | 0 | 0 | 0 | 0 |

Table 2 displays metal packaging polyesters with varying levels of cyclic, linear, and pendent group containing glycols (i.e., the pendent methyl group of MP Diol should add solubility and/or increase chain irregularity), including CHDM levels as low as 10 mol %; however, all of the compositions displayed haze.

TABLE 3

| | Mid to high molecular weight single glycol compositions | | | | | | | |
|---|---|---|---|---|---|---|---|---|
| | TMCDA | CHDMA | HDOA | MPDA | TMCDB | CHDMB | HDOB | MPDB |
| TPA | 0.15 | 0.15 | 0.15 | 0.15 | 0.15 | 0.15 | 0.15 | 0.15 |
| IPA | 0.85 | 0.85 | 0.85 | 0.85 | 0.85 | 0.85 | 0.85 | 0.85 |
| TMCD | 1.00 | 0.00 | 0.00 | 0.00 | 1.00 | 0.00 | 0.00 | 0.00 |
| CHDM | 0.00 | 1.00 | 0.00 | 0.00 | 0.00 | 1.00 | 0.00 | 0.00 |
| HDO | 0.00 | 0.00 | 1.00 | 0.00 | 0.00 | 0.00 | 1.00 | 0.00 |
| MP Diol | 0.00 | 0.00 | 0.00 | 1.00 | 0.00 | 0.00 | 0.00 | 1.00 |
| | Polymer properties | | | | | | | |
| AN | 4.81 | 0.13 | 0.51 | 0.92 | 4.26 | 1.72 | 0.33 | 0.64 |
| OHN | 27.89 | 60.81 | 54.29 | 53.81 | 13.48 | 15.65 | 17.79 | 13.30 |
| $M_n$ (g/mol) | 5443 | 5257 | 5766 | 4542 | 7446 | 12215 | 10603 | 12655 |
| $M_w$ (g/mol) | 10504 | 9653 | 10339 | 8551 | 15017 | 25485 | 22925 | 28418 |
| $T_g$ neat resin (° C.) | 114 | 48 | 13 | 28 | 123 | 70 | −3 | 44 |
| | Days to haze | | | | | | | |
| Room temperature | 0 | 0 | 0 | 0 | 4 | 0 | 0 | 0 |
| 10° C. | 0 | 0 | 0 | 0 | 3 | 0 | 0 | 0 |

Table 3 displays polyesters containing 15 mol % TPA and 85 mol % IPA with one glycol across molecular weights ranging from ~4500-13000 g/mol. All of the polymers showed immediate haze when solvated, with the exception of TMCDB, which displayed haze in 4 days at room temperature.

The invention has been described in detail with particular reference to preferred embodiments thereof, but it will be understood that variations and modifications can be effected within the spirit and scope of the invention.

We claim:

1. A composition comprising:
   (a) a polyester consisting essentially of residues of:
      (i) terephthalic acid and isophthalic acid; and
      (ii) a blend of at least two glycols;
   wherein the amount of terephthalic acid is 15 mole percent to 20 mole percent and the amount of isophthalic acid is 80 to 85 mole percent wherein the total amount of terephthalic acid and isophthalic acid in the resin equals 100 mole percent,
   wherein said glycol blend is selected from the group consisting of 2,2,4,4-tetramethyl-1,3-cyclobutanediol combined with at least one of 1,4-cyclohexane dimethanol, 1,3-cyclohexane dimethanol, ethylene glycol, 2-methyl 1,3-propane diol, and 1,6-hexanediol; and
   (b) a non-aqueous solvent;
wherein the composition remains clear at a temperature of 20-30° C. for at least 120 days.

2. The composition of claim 1 wherein said glycol blend is selected from the group consisting of 2,2,4,4-tetramethyl-1,3-cyclobutanediol combined with at least one of 1,4-cyclohexane dimethanol, methyl 1,3-propane diol, and 1,6-hexanediol.

3. A polyester for use in metal food packaging applications, the polyester consisting essentially of residues of:
   (a) 80 to 85 mole percent isophthalic acid and 20 to 15 mole percent terephthalic acid wherein the total amount of terephthalic acid and isophthalic acid in the resin equals 100 mole percent; and
   (b) a blend of at least two glycols selected from 2,2,4,4-tetramethyl-1,3-cyclobutanediol, 1,4-cyclohexane dimethanol combined with at least one of 1,4-cyclohexane dimethanol, 1,3-cyclohexane dimethanol, ethylene glycol, 2-methyl 1,3-propane diol, and 1,6-hexanediol.

4. The polyester of claim 3 wherein said glycol blend is selected from 2,2,4,4-tetramethyl-1,3-cyclobutanediol combined with at least one of 1,4-cyclohexane dimethanol, 2-methyl 1,3-propane diol, and 1,6-hexanediol.

5. A solvent borne coating composition for use in metal food packaging applications comprising:

A. a polyester resin consisting essentially of the residues of:
   (a) 80 to 85 mole percent isophthalic acid and 20 to 15 mole percent terephthalic acid based on the total amount of isophthalic acid and terephthalic acid in the resin; and
   (b) a blend of at least two glycols selected from 2,2,4,4-tetramethyl-1,3-cyclobutanediol combined with at least one of 1,4-cyclohexane dimethanol, 1,3-cyclohexane dimethanol, ethylene glycol, 2-methyl 1,3-propane diol, and 1,6-hexanediol;
B. a non-aqueous solvent;
C. a crosslinker; and
D. optionally a catalyst.

6. The solvent borne coating composition of claim 5 wherein said crosslinker is an isocyanate composition, a phenolic composition, an amino composition or a mixture thereof.

7. The solvent borne coating composition of claim 5 wherein said isocyanate composition is isophorone diisocyanate.

8. The solvent borne coating composition of claim 5 wherein said phenolic compositions is cresol or a phenolic resin.

9. The solvent borne coating composition of claim 5 wherein said amino composition is melamine or benzoguamine.

10. The solvent borne coating composition of claim 5 wherein said glycol blend is selected from 2,2,4,4-tetramethyl-1,3-cyclobutanediol combined with at least one of 1,4-cyclohexane dimethanol, 2-methyl 1,3-propane diol, and 1,6-hexanediol.

11. The composition of claim 1 wherein said non-aqueous solvent is selected from the group consisting of benzene, xylene, mineral spirits, naphtha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, ethanol, n-propanol, isopropanol, n-butanol, sec-butanol, isobutanol, benzyl alcohol, cyclohexanone, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, 2,2,4-trimethyl-1,3-pentanediol monoisobutyrate, $C_{9-10}$ dialkylbenzenes, $C_{9-10}$ trialkybenzenes, $C_{10}$ aromatics, $C_{10-13}$ aromatics and combinations thereof.

* * * * *